(12) United States Patent
Fukumori et al.

(10) Patent No.: US 11,194,315 B2
(45) Date of Patent: Dec. 7, 2021

(54) WIRELESS COMMUNICATION APPARATUS THAT MANAGES PROCESS IN FACTORY, AND PROCESS MANAGEMENT METHOD

(71) Applicant: SATAKE CORPORATION, Tokyo (JP)

(72) Inventors: Takeshi Fukumori, Tokyo (JP); Sumio Tagawa, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 0 days.

(21) Appl. No.: 16/760,937

(22) PCT Filed: Nov. 27, 2018

(86) PCT No.: PCT/JP2018/043492
§ 371 (c)(1),
(2) Date: May 1, 2020

(87) PCT Pub. No.: WO2019/107329
PCT Pub. Date: Jun. 6, 2019

(65) Prior Publication Data
US 2020/0301397 A1    Sep. 24, 2020

(30) Foreign Application Priority Data

Nov. 28, 2017  (JP) .............................. JP2017-227391

(51) Int. Cl.
*G05B 19/418* (2006.01)
*H04W 4/38* (2018.01)
(Continued)

(52) U.S. Cl.
CPC ............ *G05B 19/418* (2013.01); *H04W 4/38* (2018.02); *H04W 48/16* (2013.01); *H04W 88/06* (2013.01); *H04W 92/08* (2013.01)

(58) Field of Classification Search
CPC .............. G05B 19/418; G05B 19/4185; G05B 19/41855; G05B 19/4186;
(Continued)

(56) References Cited

U.S. PATENT DOCUMENTS

2005/0276233 A1* 12/2005 Shepard et al. .............. 370/254
2006/0209176 A1   9/2006 Nakamura et al.
(Continued)

FOREIGN PATENT DOCUMENTS

EP        2995017 A1    3/2016
JP     2006-279927 A   10/2006
(Continued)

OTHER PUBLICATIONS

International Preliminary Report Patentability for corresponding Application No. PCT/JP2018/043492, dated Feb. 19, 2019 with an English translation.
(Continued)

*Primary Examiner* — Meless N Zewdu
(74) *Attorney, Agent, or Firm* — Renner, Otto, Boisselle & Sklar, LLP

(57) ABSTRACT

The present invention is directed to managing a process in a factory while employing a communication method suitable to various kinds of data that should be transmitted. A wireless communication apparatus configured to manage a process in a factory includes an interface connected to a device and usable to receive data from the device, a first wireless communication portion, a second wireless communication portion, and a controller configured to, to wirelessly transmit the data received via the interface, select one of the first wireless communication portion and the second wireless communication portion according to this data. The first wireless communication portion is configured to carry out communication at a higher speed and with a larger capacity
(Continued)

than the second wireless communication portion. The second wireless communication portion is configured to carry out more reliable communication than the first wireless communication portion.

9 Claims, 5 Drawing Sheets

(51) Int. Cl.
*H04W 48/16* (2009.01)
*H04W 88/06* (2009.01)
*H04W 92/08* (2009.01)

(58) Field of Classification Search
CPC ........... G05B 2219/25198; G05B 2219/25283;
G05B 2219/31162; G05B 2219/31167;
G05B 2219/31168; G05B 2219/31195;
G05B 19/414; G05B 19/41815; G05B
23/0221; G05B 23/00; G05B 23/0224;
G05B 23/0264; Y02P 90/02; Y02P 90/30;
Y02P 90/80; H04W 92/08; H04W 88/06;
H04W 48/16; H04W 4/38; H04W 4/30;
H04W 92/00; H04W 48/00; H04W 48/02;
H04W 48/08; H04W 48/20; H04W 88/00;
H04W 88/18; H04W 88/16; H04W 88/10;
H04W 84/00; H04W 76/00; H04W 76/10;
H04W 76/15; H04W 16/00; H04W 16/18;
H04W 16/20; H04W 4/80; H04W 4/70;
H04W 4/33; H04W 52/02; H04W 8/00;
H04W 76/11; H04W 88/02; H04W 88/08;
H04W 88/12; H04W 92/20; H04W 92/10;
B05B 19/418; B05B 7/24; B05B 7/26;
B05B 1/40; H04L 12/28; G06F 3/038;
G06F 3/0601; G06F 11/1625; G06F
11/1629; G06F 11/3089; G06K 7/10475;
G06K 15/4045; G06K 15/405
See application file for complete search history.

(56) References Cited

U.S. PATENT DOCUMENTS

| | | | |
|---|---|---|---|
| 2007/0288709 A1* | 12/2007 | Rouhana et al. | 711/159 |
| 2013/0143542 A1* | 6/2013 | Kovvali et al. | H04W 48/18 |
| 2014/0141834 A1* | 5/2014 | Kim | H04W 88/06 |
| 2014/0213311 A1* | 7/2014 | Courtice | H04W 8/005 |
| 2017/0164291 A1 | 6/2017 | Ludwig et al. | |
| 2018/0176975 A1 | 6/2018 | Peng et al. | |

FOREIGN PATENT DOCUMENTS

| | | |
|---|---|---|
| JP | 2006-352893 A | 12/2006 |
| JP | 2008-282188 A | 11/2008 |
| JP | 2010-282269 | 12/2010 |
| WO | 2014182048 A1 | 11/2014 |
| WO | 2014203335 A1 | 12/2014 |
| WO | 2017026163 A1 | 2/2017 |

OTHER PUBLICATIONS

International Search Report for corresponding Application No. PCT/JP2018/043492, dated Feb. 19, 2019.
Delgado et al.; "Underlying Connectivity Mechanisms for Multi-Radio Wireless Sensor and Actuator Networks"; 2013 IEEE 9th International Conference on Wireless and Mobile Computing, Networking and Communications (WiMob); Oct. 1, 2013; pp. 408-413.
Partial Supplemental European Search Report for corresponding EP Application No. 18884014.4 dated Jun. 14, 2021.

* cited by examiner

WIRELESS COMMUNICATION APPARATUS THAT MANAGES PROCESS IN FACTORY, AND PROCESS MANAGEMENT METHOD

This application is a national phase of International Application No. PCT/JP2018/043492 filed Nov. 27, 2018, which claims priority to Japanese Patent Application No. 227391/2017, filed Nov. 28, 2017, which are hereby incorporated herein by reference.

TECHNICAL FIELD

The present invention relates to a wireless communication apparatus for managing a process in a factory, and a process management method.

BACKGROUND ART

Generally, a communication facility for managing a process at each machine and apparatus is set up in a factory. For example, the following patent literature, PTL 1 discloses a factory communication system using both a wired network and a wireless network. A mesh-type wireless communication is used between work units, and a peer-to-peer wireless communication is used between process units. The following patent literature, PTL 2 discloses a process management wireless communication system that switches a communication mode between a mesh communication mode and a point-to-point communication mode. The following patent literature, PTL 3 discusses a wireless communication system that collects data at various kinds of processes.

CITATION LIST

Patent Literature

[PTL 1] Japanese Patent Application Public Disclosure No. 2008-282188
[PTL 2] Japanese Patent Application Public Disclosure No. 2006-352893
[PTL 3] Japanese Patent Application Public Disclosure No. 2010-282269

SUMMARY OF INVENTION

Technical Problem

However, various kinds of communication methods have both merits and demerits, and therefore the conventional communication systems fixedly employing any of the communication methods, like the above-described patent literatures, may not necessarily achieve a system suitable to various kinds of data that should be transmitted and received, thereby leaving room for improvement in terms thereof.

Solution To Problem

The present invention has been contrived to solve at least a part of the above-described problems, and can be embodied as, for example, the following embodiments.

According to a first embodiment of the present invention, a wireless communication apparatus configured to manage a process in a factory is provided. This wireless communication apparatus includes an interface connected to a device and usable to receive data from the device, a first wireless communication portion, a second wireless communication portion, and a controller configured to, to wirelessly transmit the data received via the interface, select one of the first wireless communication portion and the second wireless communication portion according to this data. The first wireless communication portion is configured to carry out communication at a higher speed and with a larger capacity than the second wireless communication portion. The second wireless communication portion is configured to carry out more reliable communication than the first wireless communication portion.

According to this wireless communication apparatus, the first wireless communication portion and the second wireless communication having different characteristics from each other are selectively used according to the data received from the device, and therefore the communication can be carried out suitably to a characteristic of the data that should be transmitted.

According to a second embodiment of the present invention, in the first embodiment, the controller selects one of the first wireless communication portion and the second wireless communication portion based on a data size of the data. According to this configuration, the communication can be carried out suitably to the data size of the data.

According to a third embodiment of the present invention, in the first or second embodiment, the controller selects one of the first wireless communication portion and the second wireless communication portion based on a type of the data. According to this configuration, the communication can be carried out suitably to the type of the data.

According to a fourth embodiment of the present invention, in any of the first to third embodiments, the wireless communication apparatus further includes a memory. When the first wireless communication portion is selected, the controller scans a superior-side communication apparatus connected or connectable to the first wireless communication portion, and stores the data into the memory if the connected or connectable superior-side communication apparatus is not detected. According to this configuration, the data failed to be transmitted can be acquired later and used.

According to a fifth embodiment of the present invention, in the fourth embodiment, when the data is stored in the memory, the controller transmits information indicating that the data is stored in the memory to the superior-side communication apparatus via the second wireless communication portion. According to this configuration, the superior-side communication apparatus can recognize that the data is stored in the memory of the wireless communication apparatus. A worker can go to a location where the wireless communication apparatus is set up and collect the data stored in the memory based on this information.

According to a sixth embodiment of the present invention, in the fourth or fifth embodiment, when the data is stored in the memory, the controller regularly repeats the scan, and transmits the data stored in the memory to the connected or connectable superior-side communication apparatus via the first wireless communication portion upon succeeding in confirming presence of the connected or connectable superior-side communication apparatus. According to this configuration, all data can be automatically transmitted to the superior-side communication apparatus in the end even without requiring the worker to go to the location of the wireless communication apparatus.

According to a seventh embodiment of the present invention, in any of the first to sixth embodiments, the second wireless communication portion receives control data for controlling the device. The second wireless communication portion can carry out the more reliable communication than the first wireless communication portion, and therefore the device can be securely controlled according to this configuration.

According to an eighth embodiment of the present invention, in any of the first to seventh embodiments, the first wireless communication portion is configured to establish a point-to-point connection to an access point or a router. The second wireless communication portion is configured to be able to construct mesh-type topology, and is also configured to be able to construct a network capable of self-healing a communication failure with the aid of a route detour. According to this configuration, the first to seventh embodiments can be preferably realized.

According to a ninth embodiment of the present invention, a process management method in a factory is provided. This process management method includes steps of preparing a wireless communication apparatus including a first wireless communication portion and a second wireless communication portion, causing the wireless communication apparatus to receive data from a device connected to the wireless communication apparatus, and causing the wireless communication apparatus to, to wirelessly transmit the received data, select one of the first wireless communication portion and the second wireless communication portion according to this data. The first wireless communication portion is configured to carry out communication at a higher speed and with a larger capacity than the second wireless communication portion. The second wireless communication portion is configured to carry out more reliable communication than the first wireless communication portion. According to this process management method, similar advantageous effects to the first embodiment are brought about.

According to a tenth embodiment of the present invention, in the ninth embodiment, the process management method further includes steps of causing the wireless communication apparatus to scan a superior-side communication apparatus connected or connectable to the first wireless communication portion and store the data into the memory if the connected or connectable superior-side communication apparatus is not detected when the first wireless communication portion is selected, causing the wireless communication apparatus to transmit information indicating that the data is stored in the memory to the superior-side communication apparatus via the second wireless communication portion when the data is stored in the memory, and causing a worker to receive the data stored in the memory with use of a wirelessly communicable mobile terminal. According to this configuration, the worker can easily collect the data stored in the memory by going to a location where the wireless communication apparatus is set up and using the mobile terminal.

According to an eleventh embodiment of the present invention, in the ninth or tenth embodiment, the process management method further includes a step of causing the worker to overwrite a program installed in the device with use of the wirelessly communicable mobile terminal. According to this configuration, the program is updated at the location where the wireless communication apparatus is set up, and therefore the program that may have a relatively large volume does not have to be transmitted via the first wireless communication portion. Therefore, when the data received from the device always has a small volume, a setup of an access point for this first wireless communication portion may be able to be omitted in some cases. Therefore, the number of setups of access points can be reduced as a whole of the factory, and this is economical.

The present invention can be realized as various kinds of embodiments in addition to the above-described embodiments. For example, the present invention can also be realized as a program readable by a computer for realizing any of the first to eleventh embodiments, a storage medium storing this program, a network system, and the like.

DESCRIPTION OF EMBODIMENTS

Figure 1:
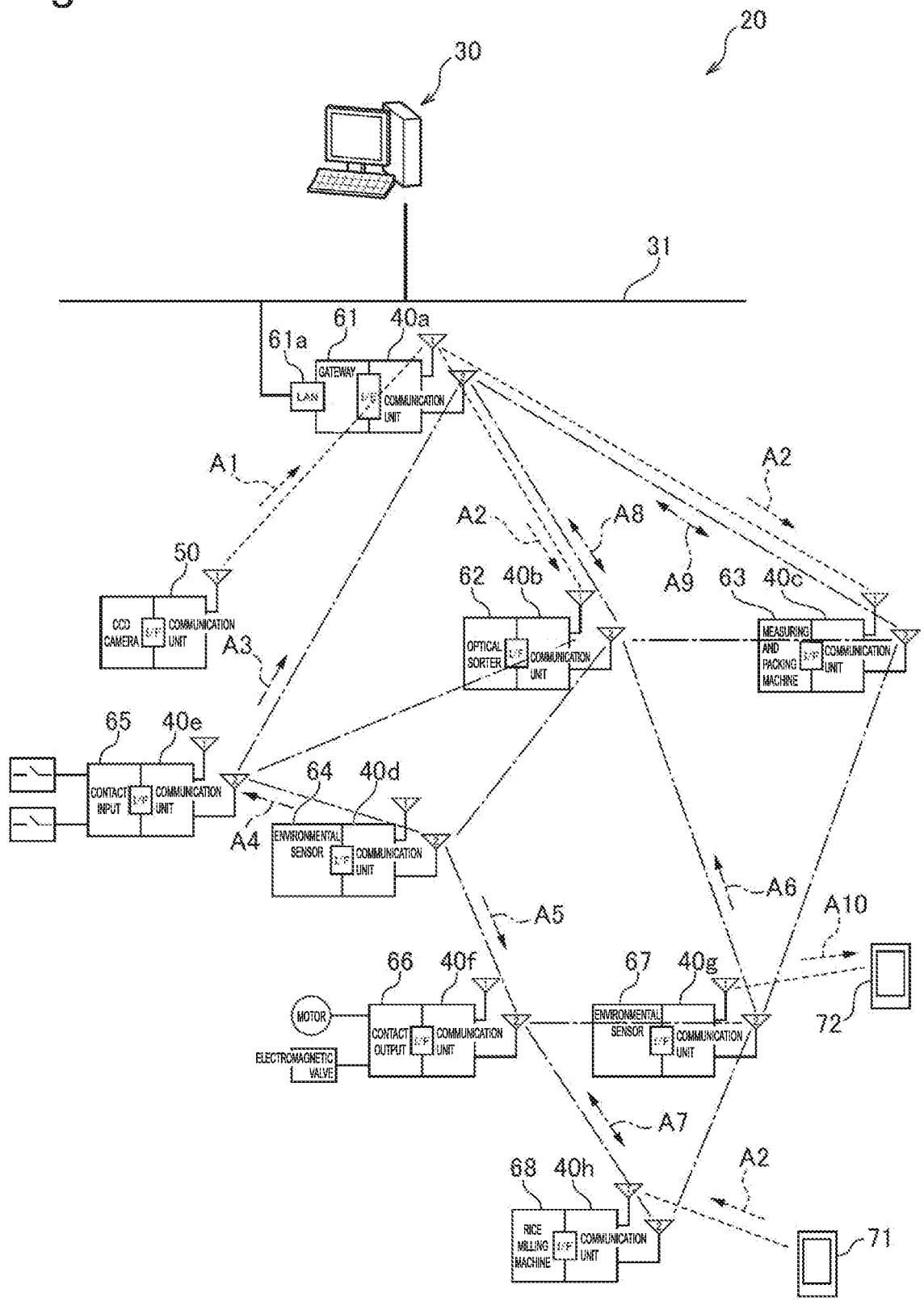
FIG. 1 illustrates a schematic configuration of a process management system constructed with use of a wireless communication apparatus according to one embodiment of the present invention.

FIG. 1 illustrates a schematic configuration of a process management system 20 constructed with use of a wireless communication apparatus 40 according to one embodiment of the present invention. The process management system 20 is a system for managing a process at a facility set up inside a factory in any factory (a rice milling plant in the present embodiment). The process management system 20 includes a process monitoring host computer 30, wireless communication apparatuses 40a to 40h (hereinafter also collectively referred to as the wireless communication apparatus 40), a wireless communication apparatus 50, and a gateway 61.

The process monitoring host computer 30 centrally controls an operation of each facility in the factory, and also accumulates various kinds of data collected from each facility (for example, data acquired from various kinds of sensors and data indicating an operational status of each facility). This data may be accumulated as big data, and used for an automatic operation using AI. The wireless communication apparatus 40a is connected to the gateway 61 via an interface. The gateway 61 is connected to the process monitoring host computer 30 via a LAN interface 61a and an Ethernet (registered trademark) network 31.

Figure 2:
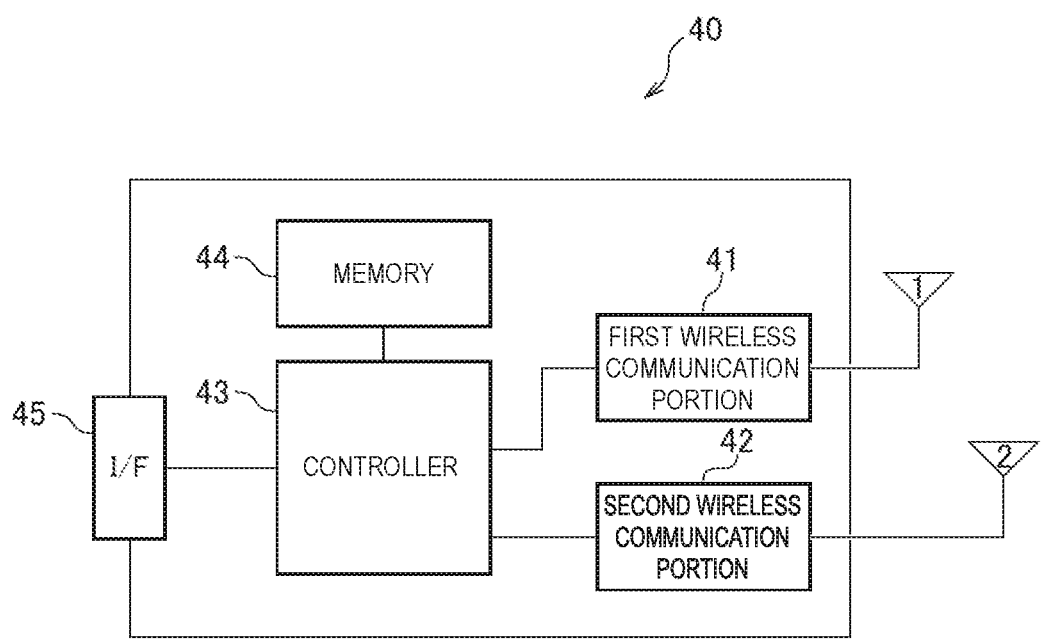
FIG. 2 illustrates a schematic configuration of the wireless communication apparatus.

FIG. 2 illustrates a schematic configuration of the wireless communication apparatus 40. The wireless communication apparatus 40 includes a first wireless communication portion 41, a second wireless communication portion 42, a controller 43, a memory 44, and an interface 45. The first wireless communication portion 41 is configured to carry out communication at a higher speed and with a larger capacity than the second wireless communication portion 42. The second wireless communication portion 42 is configured to carry out more reliable communication than the first wireless communication portion 41.

In the present embodiment, the first wireless communication portion 41 is a Wi-Fi (registered trademark) communication module. For example, a module in compliance with IEEE 802.11, 11b, 11g, 11n, or 11a can be used as the Wi-Fi communication module. The first wireless communication portion 41 of the wireless communication apparatus 40a functions as a wireless parent device, i.e., an access point. The wireless communication apparatuses 40b to 40h function as wireless child devices.

In the present embodiment, the second wireless communication portion 42 is a SmartMesh (registered trademark) communication module. The SmartMesh communication module complies with IEEE 802.15.4e, and can construct a mesh-type network topology. Further, the SmartMesh communication module is configured to be able to construct a network capable of self-healing a communication failure with the aid of a route detour, i.e., be able to autonomously construct a network topology according to a radio wave status or the like. Further, the SmartMesh communication module employs the TSCH (Time Slotted Channel Hopping) method, and increases reliability of the communication by achieving frequency redundancy based on channel hopping. All of these functions of the SmartMesh communication module contributes to allowing the second wireless communication portion 42 to have higher reliability than the reliability of the first wireless communication portion 41. The TSCH (Time Slotted Channel Hopping) method can also achieve power saving by carrying out temporally synchronous communication. Examples of the communication method satisfying these conditions include, for example, WirelessHART and ISA 100.11a.

In an alternative embodiment, a condition for the communication method employed for the first wireless communication portion 41 may be satisfaction with at least one of (1) allowing the first wireless communication portion 41 to be configured to establish a point-to-point connection with an access point or a router, (2) prohibiting the first wireless communication portion 41 from communicating with the first wireless communication portion 41 of another wireless communication apparatus 40 (functioning as the wireless child device), (3) prohibiting multi-hopping by the first wireless communication portion 41, and (4) causing the first wireless communication portion 41 to use IEEE 802.11, 11b, 11g, 11n, 11a, or 11ac for the physical layer of the OSI reference model.

Further, in another alternative embodiment, the condition for the communication method employed for the second wireless communication portion 42 may be satisfaction with at least one of (1) allowing the second wireless communication portion 42 to construct a network capable of self-healing a communication failure with the aid of a route detour, (2) allowing the second wireless communication portion 42 to construct a mesh-type topology or a line-type topology, (3) causing the second wireless communication portion 42 to have the router function and the multi-hopping function, and (4) causing the second wireless communication portion 42 to use IEEE 802.15.4 or IEEE 802.15.4g for the physical layer of the OSI reference model. Examples of the communication method satisfying these conditions include, for example, Thread, ZigbeePro, and SmartHop.

The interface 45 is an interface for connecting to any of various kinds of devices in the factory that is targeted for the process management, and providing/receiving data between this device and the wireless communication apparatus 40. The type of the interface 45 is determined according to the type of the connected device. The interface 45 may be, for example, USB, SPI, or URAT. In a case where the interface 45 is connected to a device such as a flour milling machine, a rice milling machine, a drier, and an optical sorter, the interface 45 may be USB, SPI, or URAT. In a case where the interface 45 is connected to a sensor substrate, an input substrate, or an output substrate, the interface 45 may be SPI or URAT.

The controller 43 realizes various kinds of functions by executing a program stored in the memory 44. For example, the controller 43 controls operations of the first wireless communication portion 41 and the second wireless communication portion 42. Further, to transmit the data received from the device via the interface 45, the controller 43 selects one of the first wireless communication portion 41 and the second wireless communication portion 42 according to this data. Details of this processing (referred to as data transmission processing) will be described below. The memory 44 is a nonvolatile storage medium, and the data received from the device via the interface 45 is stored in the memory 44 in addition to the above-described program.

Now, the description will continue, referring back to FIG. 1. The various kinds of devices are connected to the wireless communication apparatuses 40b to 40h via the interfaces 45, respectively. In the example illustrated in FIG. 1, an optical sorter 62 is connected to the wireless communication apparatus 40b. A measuring and packing machine or weighing and packing machine 63 is connected to the wireless communication apparatus 40c. An environmental sensor 64 (for example, a temperature sensor, a humidity sensor, an atmospheric pressure sensor, and a vibration sensor) attached to various kinds of devices is connected to the wireless communication apparatus 40d. A contact input 65 of various kinds of devices is connected to the wireless communication apparatus 40e. A contact output 66 of various kinds of devices (a motor and an electromagnetic valve in the present example) is connected to the wireless communication apparatus 40f. An environmental sensor 67 mounted on various kinds of devices is connected to the wireless communication apparatus 40g. A rice milling machine 68 is connected to the wireless communication apparatus 40h.

The wireless communication apparatus 50 is different from the wireless communication apparatus 40 in terms of being equipped with only the first wireless communication portion 41 and unequipped with the second wireless communication portion 42. A CCD camera is connected to the wireless communication apparatus 50 via an interface.

The process management system 20 configured in this manner uses both the wireless communication by the first wireless communication portion 41 and the wireless communication by the second wireless communication portion 42. In FIG. 1, the wireless communication by the first wireless communication portion 41 is indicated by dotted lines, and the wireless communication by the second wireless communication portion 42 is indicated by alternate long and short dash lines. The wireless communication by the first wireless communication portion 41 is established by a point-to-point connection between the wireless communication apparatus 40a (the access point) and each of the wireless communication apparatus 50, the wireless communication apparatus 40b, and the wireless communication apparatus 40c. The wireless communication by the second wireless communication portion 42 constructs the mesh-type topology among the wireless communication apparatuses 40a to 40h. The wireless communication apparatus 40a is a communication apparatus on a superior side (the process monitoring host computer 30 side) as viewed from the wireless communication apparatuses 40b to 40h.

An arrow A1 indicates how video data acquired by the CCD camera is transmitted from the wireless communication apparatus 50 to the wireless communication apparatus 40a. This video data is received and stored by the process monitoring host computer 30.

Arrows A2 indicate how update programs are transmitted from the process monitoring host computer 30 to the individual devices via the wireless communication apparatuses 40, respectively. The wireless communication by the first wireless communication portion 41 is used for the transmission of the update programs. The wireless communication apparatuses 40b and 40c are set up in a distance range communicable with the wireless communication apparatus 40a using the first wireless communication portion 41, and therefore the update programs are transmitted from the process monitoring host computer 30 to the wireless communication apparatuses 40b and 40c via the wireless communication apparatus 40a, respectively, and are installed in the optical sorter 62 and the measuring and packing machine 63, respectively. On the other hand, the wireless communication apparatuses 40d to 40h are not set up within the distance range communicable with the wireless communication apparatus 40a using the first wireless communication portion 41. Therefore, when installing the update program into the rice milling machine 68, a worker may install the update program by going to the location where the rice milling machine 68 is set up, and establishing wireless communication between a mobile terminal 71 and the first wireless communication portion 41 of the wireless communication apparatus 40 with use of the mobile terminal 71 (for example, a smart-phone or a tablet PC).

An arrow A3 indicates how contact input data is transmitted from the contact input 65 to the process monitoring host computer 30 side via the second wireless communication portion 42 of the wireless communication apparatus 40e. An arrow A4 indicates how environmental data (the data acquired by the environmental sensor 64) is transmitted from the environmental sensor 64 to the process monitoring host computer 30 side via the second wireless communication portion 42 of the wireless communication apparatus 40d. An arrow A5 indicates how contact control data is transmitted from the process monitoring host computer 30 to the contact output 66 via the second wireless communication portion 42 of the wireless communication apparatus 40f.

An arrow A6 indicates how environmental data is transmitted from the environmental sensor 67 to the process monitoring host computer 30 side via the second wireless communication portion 42 of the wireless communication apparatus 40g. An arrow A7 indicates how rice milling machine control data is transmitted from the process monitoring host computer 30 to the rice milling machine 68 via the second wireless communication portion 42 of the wireless communication apparatus 40h, and, along therewith, how rice milling operational data is transmitted from the rice milling machine 68 to the process monitoring host computer 30 side via the second wireless communication portion 42 of the wireless communication apparatus 40h. An arrow A8 indicates how optical sorter control data is transmitted from the process monitoring host computer 30 to the optical sorter 62 via the second wireless communication portion 42 of the wireless communication apparatus 40b, and, along therewith, how sorting result data is transmitted from the optical sorter 62 to the process monitoring host computer 30 side via the second wireless communication portion 42 of the wireless communication apparatus 40b. An arrow A9 indicates how measuring and packing machine control data is transmitted from the process monitoring host computer 30 to the measuring and packing machine 63 via the second wireless communication portion 42 of the wireless communication apparatus 40c, and, along therewith, how measured result data is transmitted from the measuring and packing machine 63 to the process monitoring host computer 30 side via the second wireless communication portion 42 of the wireless communication apparatus 40c.

Figure 3:
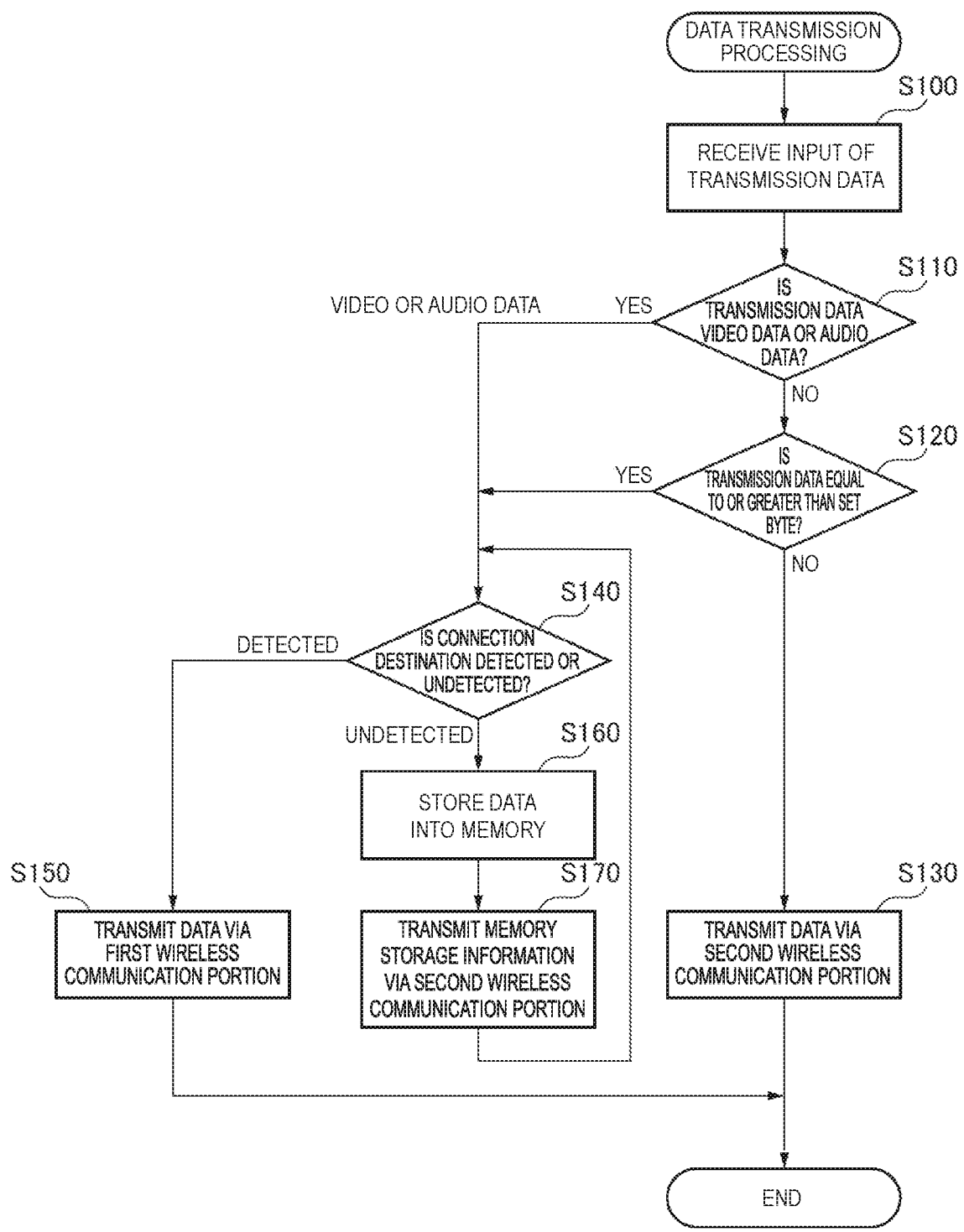
FIG. 3 is a flowchart illustrating one example of a flow of data transmission processing in the wireless communication apparatus.

FIG. 3 is a flowchart illustrating one example of the data transmission processing performed in the wireless communication apparatuses 40b to 40h. This processing is performed by the controller 43. In the present example, the data transmission processing will be described assuming that this processing is performed by the wireless communication apparatus 40g connected to the environmental sensor 67. In the present embodiment, a sensor substrate provided to the environmental sensor 67 calculates a calculation value (for example, an acceleration effective value, a speed acquired by integrating this acceleration effective value, and a displacement acquired by integrating this speed) based on raw data indicating a sensor detection value (for example, waveform data indicating the acceleration). Then, the sensor substrate determines whether this sensor detection value is a normal value by comparing the acquired calculation value with a predetermined threshold value. If the sensor detection value is normal, the sensor substrate outputs only the calculation value to the interface 45 as text data, and discards the raw data. On the other hand, if the sensor detection value is abnormal, the sensor substrate outputs the raw data to the interface 45 as binary data in addition to outputting the calculation value to the interface 45 as the text data. This raw data is used for the process monitoring host computer 30 to estimate the state of the device.

In the data transmission processing, the controller 43 first receives an input of data that should be transmitted (hereinafter referred to as transmission data) from the device connected to the interface 45 (step S100). Next, the controller 43 determines whether the received transmission data is video data or audio data (step S110). For example, in the case where the interface 45 is USB, the controller 43 can determine the type of the transmission data by reading out a device descriptor contained in the transmission data.

Then, if the transmission data is neither video data nor audio data (step S110: NO), the controller 43 determines whether the data size of the transmission data is equal to or greater than a preset threshold value (step S120). This threshold value is set so as to allow the controller 43 to determine whether the data received by the interface 45 from the environmental sensor 64 is the text data or the binary data. The flowchart may be set so as to omit step S110 and proceed from step S100 to step S120. If the data size of the transmission data is smaller than the threshold value (step S120: NO), the controller 43 selects the second wireless communication portion 42 capable of carrying out the communication that is relatively low-speed and small-capacity but highly reliable, and transmits the transmission data to the process monitoring host computer 30 side via the second wireless communication portion 42 (step S130).

On the other hand, if the transmission data is the video data or the audio data (step S110: YES), or if the data size of the transmission data is equal to or greater than the threshold value (step S120: YES), i.e., the transmission data is the binary data, the controller 43 determines presence or absence of the superior-side communication apparatus (the wireless communication apparatus 40a in the present example) connected or connectable to the first wireless communication portion 41 of the apparatus that the controller 43 itself is mounted (the wireless communication apparatus 40g) (step S140). This determination is made by, for example, carrying out active scan.

If the connected or connectable superior-side communication apparatus is detected (step S140: DETECTED), the controller 43 selects the first wireless communication portion 41 capable of carrying out the relatively high-speed and large-capacity communication and transmits the transmission data to the process monitoring host computer 30 side via the first wireless communication portion 41 (step S150). On the other hand, if the connected or connectable superior-side communication apparatus is not detected (step S140: UNDETECTED), the controller 43 stores the transmission data into the memory 44 (step S160). Then, the controller 43 transmits information indicating that the transmission data is stored in the memory 44 (hereinafter referred to as memory storage information) to the process monitoring host computer 30 with use of the second wireless communication portion 42 (step S170).

Then, the controller 43 returns the processing to step S140, and repeats the processing in steps S140 to S170. Due to this repetition, the controller 43 can automatically transmit the data stored in the memory 44 to the process monitoring host computer 30 in the end, i.e., when the controller 43 can confirm the presence of the connected or connectable superior-side communication apparatus. The worker can be aware that the transmission data is stored in the memory 44 by the process monitoring host computer 30 receiving the memory storage information. Therefore, when wanting to collect this stored transmission data quickly, the worker can collect the transmission data stored in the memory 44 by going to the location where the wireless communication apparatus 40g is set up and using a mobile terminal 72 as indicated by an arrow A10 in FIG. 1.

According to the above-described data transmission processing, the first wireless communication portion 41 and the second wireless communication 42 having different characteristics from each other are selectively used according to the data received from the device connected to the interface 45, i.e., any one of the first wireless communication portion 41 and the second wireless communication portion 42 is selected so as to make utilization of the advantages of the first wireless communication portion 41 and the second wireless communication portion 42. Therefore, the communication can be carried out suitably to the characteristic of the transmission data.

Further, the control data for controlling the device is received with use of the relatively highly reliable second wireless communication portion 42, and therefore the device can be securely controlled.

Further, the number of setups of access points can be reduced by installing the update program or collecting the transmission data stored in the memory 44 via the first wireless communication portion 41 near the location where the wireless communication apparatus 40 is set up with use of the mobile terminal 71 or 72.

Figure 4:
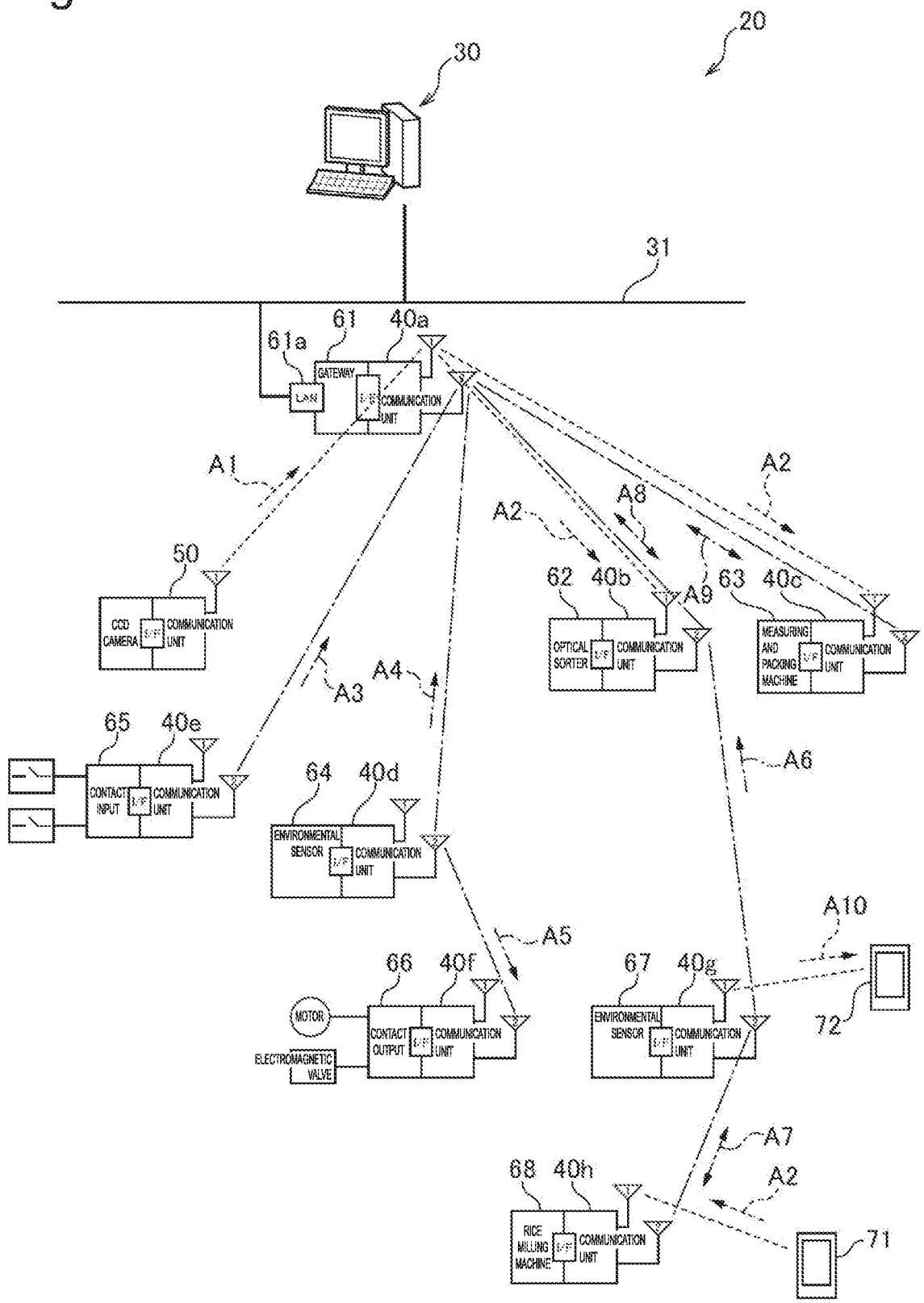
FIG. 4 illustrates a schematic configuration of a process management system according to an alternative embodiment.

FIG. 4 illustrates the process management system 20 according to an alternative embodiment. In FIG. 4, the same reference numerals as FIG. 1 are assigned to components and communication shared with FIG. 1. In the following description, FIG. 4 will be described focusing only on differences from FIG. 1. In the example illustrated in FIG. 4, the second wireless communication portion 42 is configured to be able to construct a line-type topology instead of the mesh-type topology. The line-type topology can be configured, for example, when SmartHop is employed as the communication method. SmartHop allows the second wireless communication portion 42 to self-heal a communication failure with the aid of a route detour between routers, thereby allowing it to achieve more reliable communication than the first wireless communication portion 41.

Figure 5:
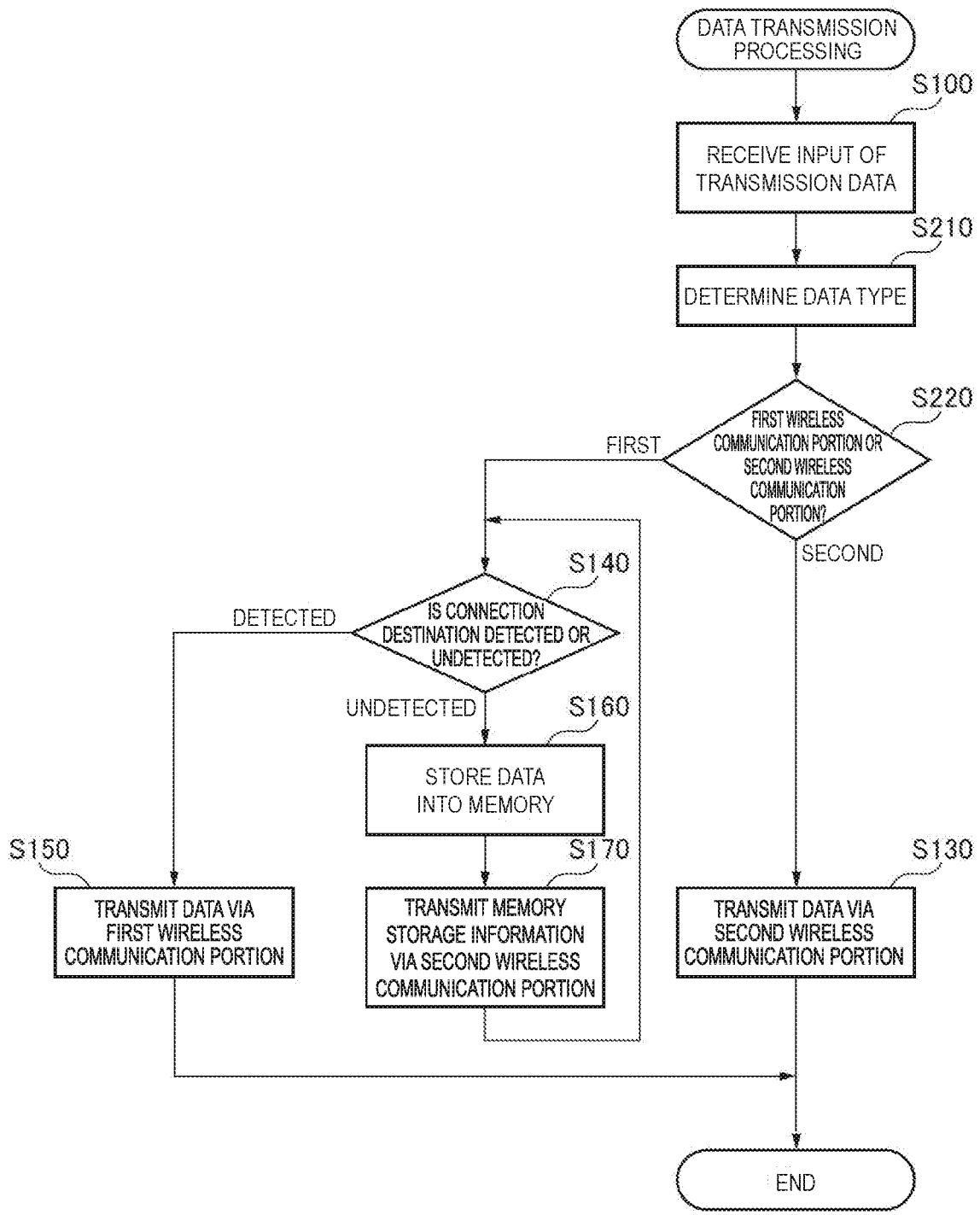
FIG. 5 is a flowchart illustrating a flow of data transmission processing according to the alternative embodiment.

FIG. 5 is a flowchart illustrating a flow of data transmission processing according to the alternative embodiment. In FIG. 5, the same step numbers as FIG. 3 are assigned to steps shared with FIG. 3. In the following description, FIG. 5 will be described focusing only on differences from FIG. 3. Upon receiving the transmission data (step S100), the controller 43 determines the data type of the transmission data (step S210). In the case where the interface 45 is USB, the controller 43 can determine the type of the transmission data by reading out the device descriptor contained in the transmission data as described above. On the other hand, in the case where the interface 45 is SPI or URAT, the controller 43 can determine the type of the transmission data by reading out a region storing information for identifying the data format in header information contained in the transmission data. This information for identifying the data format is added according to the type of the data output from the device by the device.

Next, the controller 43 determines whether the data type of the transmission data is a data type associated with the first wireless communication portion 41 in advance or a data type associated with the second wireless communication portion 42 in advance (step S220). Then, if the data type of the transmission data is the data type associated with the first wireless communication portion 41 in advance (step S220: FIRST), the controller 43 causes the processing to proceed to step S140. On the other hand, if the data type of the transmission data is the data type associated with the second wireless communication portion 42 in advance (step S220: SECOND), the controller 43 causes the processing to proceed to step S130. Such data transmission processing also allows the communication to be carried out suitably to the characteristic of the transmission data similarly to FIG. 3.

Having described several embodiments of the present invention, the above-described embodiments of the invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be combined or omitted within a range that allows them to remain capable of achieving at least a part of the above-described objects or producing at least a part of the above-described advantageous effects.

REFERENCE SIGNS LIST 20 process management system
30 process monitoring host computer
31 Ethernet network
40a to 40h wireless communication apparatus
41 first wireless communication portion
42 second wireless communication portion
43 controller
44 memory
45 interface
50 wireless communication apparatus
61 gateway
61a LAN interface
62 optical sorter
63 measuring and packing machine
64 environmental sensor
65 contact input
66 contact output
67 environmental sensor
68 rice milling machine
71, 72 mobile terminal

The invention claimed is:

1. A wireless communication apparatus configured to manage a process in a factory, the wireless communication apparatus comprising:
an interface connected to a device and usable to receive data from the device;
a first wireless communication portion;
a second wireless communication portion; and
a controller configured to, to wirelessly transmit the data received via the interface, select one of the first wireless communication portion and the second wireless communication portion according to the data,
wherein the first wireless communication portion is configured to carry out communication at a higher speed and with a larger capacity than the second wireless communication portion, and
wherein the second wireless communication portion is configured to carry out more reliable communication than the first wireless communication portion;
the wireless communication apparatus further comprising a memory,
wherein, when the first wireless communication portion is selected, the controller scans a superior-side communication apparatus connected or connectable to the first wireless communication portion and stores the data into the memory of the connected or connectable superior-side communication apparatus is not detected.

2. The wireless communication apparatus according to claim 1, wherein the controller selects one of the first wireless communication portion and the second wireless communication portion based on a data size of the data.

3. The wireless communication apparatus according to claim 1, wherein the controller selects one of the first wireless communication portion and the second wireless communication portion based on a type of the data.

4. The wireless communication apparatus according to claim 1, wherein, when the data is stored in the memory, the controller transmits information indicating that the data is stored in the memory to the superior-side communication apparatus via the second wireless communication portion.

5. The wireless communication apparatus according to claim 1, wherein, when the data is stored in the memory, the controller regularly repeats the scan, and transmits the data stored in the memory to the connected or connectable superior-side communication apparatus via the first wireless communication portion upon succeeding in confirming presence of the connected or connectable superior-side communication apparatus.

6. The wireless communication apparatus according to claim 1, wherein the second wireless communication portion receives control data for controlling the device.

7. The wireless communication apparatus according to claim 1, wherein the first wireless communication portion is configured to establish a point-to-point connection to an access point or a router, and
wherein the second wireless communication portion is configured to be able to construct a network capable of self-healing a communication failure with the aid of a route detour.

8. A process management method in a factory, the process management method comprising steps of:
preparing a wireless communication apparatus including a first wireless communication portion and a second wireless communication portion;
causing the wireless communication apparatus to receive data from a device connected to the wireless communication apparatus; and
causing the wireless communication apparatus to, to wirelessly transmit the received data, select one of the first wireless communication portion and the second wireless communication portion according to the data,
wherein the first wireless communication portion is configured to carry out communication at a higher speed and with a larger capacity than the second wireless communication portion, and
wherein the second wireless communication portion is configured to carry out more reliable communication than the first wireless communication portion;
the process management method further comprising steps of:
causing the wireless communication apparatus to scan a superior-ide communication apparatus connected or connectable to the first wireless communication portion and store the data into the memory if the connected or connectable superior-side communication apparatus is not detected, when the first wireless communication portion is selected;
causing the wireless communication apparatus to transmit information indicating that the data is store in the memory to the superior-side communication apparatus via the second wireless communication portion, when the data is stored in the memory; and
causing a worker to receive the data stored in the memory with use of a wirelessly communicable mobile terminal.

9. The process management method according to claim 8, further comprising a step of causing the worker to overwrite a program installed in the device with use of the wirelessly communicable mobile terminal.

* * * * *